United States Patent Office 3,644,338
Patented Feb. 22, 1972

3,644,338
4-AMINOALKYL-3-ARYL-1,4-BENZOXAZEPIN-5(4H)-ONES
Karl Schenker, Binningen, Switzerland, assignor to Ciba Corporation, Summit, N.J.
No Drawing. Filed Mar. 11, 1969, Ser. No. 806,300
Claims priority, application Switzerland, Mar. 21, 1968, 4,171/68; Feb. 19, 1969, 2,508/69
Int. Cl. C07d 87/54
U.S. Cl. 260—239.3       9 Claims

ABSTRACT OF THE DISCLOSURE 4-aminoalkyl-3-aryl-1,4-benzoxazepin-5(4H)-ones of the formula

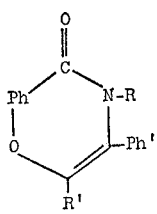

in which Ph represents an optionally substituted o-phenylene radical, Ph' an optionally substituted aryl radical, R an aminoalkyl radical disubstituted at the amino nitrogen atom, in which the amino nitrogen atom is separated from the cyclic nitrogen atom by at least 2 carbon atoms, and R' stands for a hydrogen atom or an alkyl group are useful as antiphlogistics and as mild analgesics.

SUMMARY OF THE DISCLOSURE

The present invention relates to new benzoxazepinones. Especially it concerns benzoxazepinones of the formula

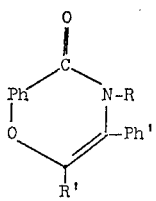

in which Ph represents an o-phenylene residue, Ph' an aryl residue, R an aminoalkyl radical disubstituted on the amino nitrogen atom, in which the amino nitrogen atom is separated from the cyclic nitrogen atom by at least 2 carbon atoms, and R' represents a hydrogen atom or an alkyl group, and their salts.

The amino group of the aminoalkyl radical R in the new compounds is a tertiary aliphatic amino group, and one of its substituents may be linked with the alkylene radical which connects it with the cyclic nitrogen atom. A tertiary aliphatic amino group is an amino group disubstituted by one bivalent or two monovalent residues of aliphatic character. In this context the term residues of aliphatic character describes those whose first member linked with the nitrogen atom is not a member of an aromatic system. Therefore, there may be mentioned, for example, as substituents of the said amino group lower hydrocarbon residues of aliphatic character whose carbon chain may be interrupted by hetero atoms such as oxygen, sulphur or nitrogen atoms and/or which may be substituted for instance by hydroxyl groups. Lower hydrocarbon residues of aliphatic character as substituents of the amino group are in the first place residues containing no more than 8 carbon atoms, being alkyl, alkenyl, alkylene, alkinyl, cycloalkyl, cycloalkenyl, cycloalkylalkyl or cycloalkyakenyl residues or cycloalkenylalkyl or -alkenyl residues or aralkyl or aralkenyl residues, for example phenyl-lower alkyl or -alkenyl groups, for example a benzyl, phenylethyl or cinnamyl residues which may be substituted, for example as described below for the residues Ph and Ph'. Residues of this kind, interrupted by hetero atoms, are in the first place oxaalkyl, oxaalkylene, azaalkylene or thiaalkylene residues. As substituents of the amino group there may be specially mentioned methyl, ethyl, allyl, methallyl, propyl, isopropyl, propargyl residues; linear or branched butyl, pentyl, hexyl or heptyl residues linked in any desired position; 3-oxabutyl, 3-oxapentyl, 3-oxaheptyl, 2-hydroxyethyl, 3-hydroxypropyl, butylene-(1,4), pentylene-(1,5), hexylene-(1,5), hexylene-(1,6), hexylene-(2,5), heptylene-(1,7), heptylene-(2,7), heptylene-(2,6), 3-oxa-pentylene-(1,5), 3-thiapentylene-(1,5), 2,4-dimethyl-3-thiapentylene-(1,5), 3-azapentylene-(1,5), 3-lower alkyl-3-azapentylene-(1,5) such as 3-methyl-3-azapentylene-(1,5); 3-(hydroxy-lower alkyl)-3-azapentylene-(1,5) such as 3-(β-hydroxyethyl)-3-azapentylene-(1,5), 3-oxahexylene-(1,6) or 3-azahexylene-(1,6) residues; optionally alkylated, such as methylated, cyclopropyl, cyclopentyl or cyclohexyl residues, or cyclopropyl-, cyclopentyl- or cyclohexyl-methyl or -ethyl residues.

The amino group of the aminoalkyl residues R is primarily a di-lower alkylamino group such as a dimethylamino, diethylamino, N-methyl-N-ethylamino, dipropylamino, diisopropylamino, dibutylamino, di-secondary butylamino or di-amylamino group or an optionally C-lower alkylated and/or in ring β-mono-unsaturated pyrrolidino or piperidino group or an optionally C-lower alkylated piperazino, N'-lower alkyl- or N'-(hydroxy-lower alkyl)-piperazino, thiomorpholino or morpholino group.

A tertiary aminoalkyl group, in which one substituent of the tertiary amino group is linked with the alkylene radical linking the cyclic nitrogen atom with the amino nitrogen atom is, for example, an N-lower alkylpyrrolidinyl-2- or -3-lower alkylamino or N-lower alkylpiperidyl-2-, -3- or -4-lower alkylamino group.

The alkylene radical which connects the amino nitrogen atom with the cyclic nitrogen atom is more especially a linear or branched lower alkylene radical preferably containing at most 6 carbon atoms, which separates the two nitrogen atoms by 2 to 5, especially 2 or 3, carbon atoms, being for instance a butylene-(1,4), pentylene-(1,5), pentylene-(2,5), butylene-(2,4), propylene-(1,2), propylene-(2,3), butylene-(3,4) or especially ethylene-(1,2) or propylene-(1,3) residue.

An alkyl group R' is especially a lower alkyl group, such as one of those mentioned below, more especially a methyl group.

The o-phenylene residue pH may be unsubstituted or carry one, two or more substituents. Suitable substituents are primarily lower alkyl groups, lower alkoxy groups, halogen atoms trifluoromethyl or nitro groups. A possible substituent is preferably in position 7.

The aryl radical Ph' is more especially a phenyl residue, which may be unsubstituted or carry one, two or more substituents, preferably those mentioned for the o-phenylene residue Ph.

Lower alkyl groups are especially those containing at most 6 carbon atoms, for example methyl, ethyl, propyl, isopropyl residues, or linear or branched butyl, pentyl or hexyl residues bound in any desired position.

Lower alkoxy groups are especially those containing at most 6 carbon atoms, for example methoxy, ethoxy, propoxy, isopropoxy groups, or linear or branched butoxy, pentoxy or hexoxy groups.

Particularly suitable halogen atoms are fluorine, chlorine, bromine or iodine atoms.

The new compounds possess valuable pharmacological properties, inter alia in addition to an anti-inflammatory effect, as can be shown in animal tests, for example on oral administration of doses of 10 to 100 mg./kg. in the kaolin paw edema test in the rat, more especially an analgesic, for example antinociceptive, effect, as can be shown in animal tests, for example on oral or subcutaneous administration of doses of 10–100 mg./kg. to mice, for instance in the Writhing syndrome test. Furthermore, they act against the psychomotor excitation caused by mescalin, as can be shown in animal tests, for example on the mouse on oral administration of 30 to 100 mg./kg.

The new compounds are therefore useful as antiphlogistics and as mild analgesics with an additional psychopharmacological effect. The new compounds are also valuable intermediates for the manufacture of other useful substances, especially of pharmacologically active compounds.

Special mention deserve the compound of the formula

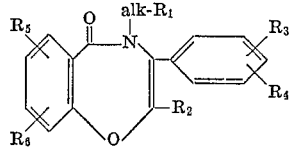

in which alk represents a lower alkylene radical containing 2 to 4, especially 2 or 3, carbon atoms; $R_1$ represents a di-lower alkylamino group or in the second place an optionally C-lower alkylated and/or in ring β-mono-unsaturated pyrrolidino or piperidino group or an optionally C-lower alkylated piperazino, N'-lower alkyl-piperazino, N'-(hydroxy-lower alkyl)-piperazino, thiomorpholino or morpholino group, $R_2$ represents a lower alkyl group or especially a hydrogen atom, and $R_3$, $R_4$, $R_5$ and $R_6$ may be identical or different and each represents a hydrogen atom, a lower alkyl or alkoxy group, a halogen atom, a trifluoromethyl or nitro group, and especially compounds of the formula

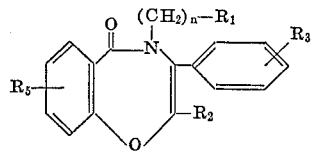

in which $n=2$ or 3, and $R_1$, $R_2$, $R_3$ and $R_5$ have the above meanings, especially those compounds of the preceding formula in which $R_1$ represents a di-lower alkylamino group, and $n$, $R_2$, $R_3$ and $R_5$ have the above meanings.

Of very special value because of their antinociceptive (analgesic) effect are 2-methyl-3-(p-chlorophenyl)-4-(γ-di - dimethylaminopropyl)-1,4-benzoxazepine-5(4H)-one, as well as 3-phenyl-4-(β-dimethylaminoethyl) - 1,4-benzoxazepin-5(4H)-one which, for example in form of its maleate, produces in the mouse a distinct antinociceptive effect on oral administration of a dose of 10 to 20 mg./kg., and 3-phenyl-4-(β-dimethylamino - ethyl)-8-nitro-1,4-benzoxazepine-5(4H)-one which for example in the form of its oxalate, has a distinct antinociceptive effect in the mouse on oral administration of a dose of 20 to 30 mg./kg.

The new compounds are accessible by known methods.
Preferably, in a compound of the formula

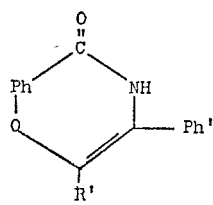

in which Ph, Ph' and R' have the above meanings, the above-defined residue R is introduced.

The residue R is introduced, for example, by reaction with a compound of the Formula RX, in which R has the above meaning and X represents a reactive esterified hydroxyl group. Reactive esterified hydroxyl groups are above all hydroxyl groups esterified with a hydrohalic acid such as hydrochloric, hydrobromic or hydriodic acid.

The reaction is advantageously performed in the presence of a solvent such as a polar solvent, for example in a lower alkanol such as methanol or ethanol or in a lower alkanone such as acetone and especially in presence of a condensing agent such as a weak base, such as a weak inorganic base, for example an alkali metal carbonate such as sodium or potassium carbonate, or in a weak organic base such as a tertiary amine, for example a tri-lower alkylamine such as trimethylamine or triethylamine, a Hünig's base or pyridine, at room temperature or with cooling or heating.

Strong bases, such as alkali metal hydrides, amides or alcoholates are not very suitable as condensing agents for the reaction mentioned above, because in their presence rearrangement reactions may occur so that the yield of the desired final product is substantially reduced.

Depending on the starting materials and reaction conditions used the final products are obtained in free form or in the form of their salts which are likewise included in this invention. The salts of the final products may be converted into the free bases in known manner, for example with alkalies or ion exchange resins. When the free bases are reacted with organic or inorganic acids, especially those which are capable of forming therapeutically acceptable salts, they form salts. As such acids there may be mentioned for example: Hydrohalic acids, sulphuric and phosphoric acids, nitric acid; aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic, p-aminosalicylic, methanesulphonic, ethanesulphonic, hydroxyethanesulphonic, ethylenesulphonic acid; halobenzenesulphonic, toluenesulphonic, naphthalenesulphonic or sulphanilic acid; methionine, tryptophan, lysine or arginine.

These or other salts of the new compounds, for example their picrates or perchlorates, may also be used for purifying the resulting free bases, by converting the free bases into salts, isolating the salts and liberating the bases again from them. In view of the close relationship between the new compounds in free form and in form of their salts, what has been said above and hereinafter with reference to the free bases applies equally to the corresponding salts wherever possible and useful.

The invention further includes any variant of the process in which an intermediate obtainable at any stage of the process is used as starting material and any remaining process steps are carried out, or in which a starting material is formed under the reaction conditions or a reactant may be used in form of a salt thereof.

When the compounds contain an asymmetric carbon atom, for example in the aminoalkyl radical R or in another substituent and depending on the chosen starting materials and reaction conditions, they may be obtained as optical antipodes or racemates or, when they contain at least 2 asymmetric carbon atoms, as isomer mixtures (racemate mixtures).

A resulting isomer mixture (racemate mixture) may on the basis of the physico-chemical differences between its constituents be resolved in known manner (for example by chromatography and/or fractional crystallization) into the two stereoisomeric (diastereomeric) pure racemates.

Resulting racemates can be resolved in known manner (for example by recrystallization from an optically active solvent, or with the aid of microorganisms or by reaction with an optically active acid capable of forming salts with the racemic compound and separation of the salts thus obtained, for example on the basis of their different solubilties) into the diastereomers from which the antipodes can be liberated by treatment with suitable reagents. Particularly frequently used optically active acids are, for example, the D- and L- forms of tartaric acid, di-o-toluyltartaric acid, malic, mandelic, camphorsulphonic or quinic acid. It is of advantage to isolate the more active of the two antipodes.

The reactions of this invention are advantageously performed with the use of starting materials that give rise to the groups of final products specially mentioned above and especially to the specifically described or emphasized final products.

The starting materials are known or insofar as they are new they may be prepared by known methods.

The 1,4-benzoxazepin-5(4H)-ones unsubstituted in position 4, used as starting materials, are for example, obtained when a 2-(2-oxoethoxy)-benzamide of the formula

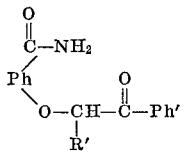

in which Ph, Ph′ and R′ have the above meanings—is subjected to intramolecular condensation.

The intramolecular condensation (cyclization) is preferably performed with heating and especially in the presence of a solvent and a condensing agent. The condensation proceeds particularly well in the presence of an acid condensing agent, such as a strong acid, for example a mineral acid such as hydrochloric or sulphuric acid, or of an organic sulphonic acid, for example an arylsulphonic acid, for example benzenesulphonic, p-bromobenzenesulphonic or p-toluenesulphonic acid. Particularly good yields are obtained when working in a hydrocarbon such benzene, a xylene or toluene as solvent and with the use of an arylsulphonic acid, such as p-toluenesulphonic acid, as condensing agent.

The above-mentioned 2-(2-oxoethoxy)-benzamides are accessible in known manner by reacting a suitable α-halogenoxo compound with an appropriate salicylic acid amide.

The other starting materials are known or insofar as they are new they may likewise be prepared by known methods.

The new compounds may be used, for example, in the form of pharmaceutical preparations containing them in free form or in the form of their therapeutically useful salts, in admixture or conjunction with a solid or liquid organic or inorganic pharmaceutical excipient suitable, for example, for enteral, for instance oral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules, suppositories salves or creams, or in liquid form solutions (for example elixirs or syrups), suspensions or emulsions. They may be sterilized and/or may contain aids such a preserving, stabilizing, wetting or emulsifying agents, solubilizers, salts for regulating the osmotic pressure or buffers. They may also contain further therapeutically valuable substances. The pharmaceutical preparations are formulated by the usual methods.

The following examples illustrate the invention.

EXAMPLE 1

A mixture of 11.85 g. (0.05 mol) of 3-phenyl-1,4-benzoxazepin-5(4H)-one, 50 g. of finely ground potassium carbonate and 9.0 g. (0.0523 mol) of β-diethylaminoethylchloride hydrochloride in 250 ml. of acetone is refluxed for 15 hours. The undissolved inorganic material is then filtered off and the filtrate evaporated to dryness. The residue is dissolved in chloroform and repeatedly extracted with water. The chloroform solution is dried over anhydrous sodium sulphate and then evaporated under vacuum. The residual oil is distilled under a high vacuum, to yield 3-phenyl-4-(β-diethylaminoethyl)-1,4-benzoxazepin-5(4H)-one of the formula

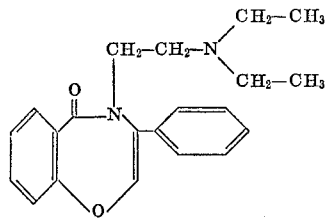

as a colourless oil which boils at 170 to 171° C. under a pressure of 0.1 mm. Hg.

The methanesulphonate of the base may be prepared thus:

The base is dissolved in five times its own weight of acetone and neutralized with one equivalent of methanesulphonic acid, whereupon the methanesulphonate crystallizes in the form of colourless flakes melting at 154 to 155° C.

The 3-phenyl-1,4-benzoxazepin-5(4H)-one used as starting material may be prepared in the following manner:

A mixture of 95.9 g. (0.7 mol) of salicylamide, 124 g. (0.8 mol) of phenacylchloride, 290 g. of ground potassium carbonate and 2 g. of potassium iodide in 1750 ml. of acetone is stirred and heated at the boil for 12 hours. The inorganic salts are then filtered off and the filtrate is evaporated under a water-jet vacuum. The oily residue is taken up in 800 ml. of chloroform and freed from the residual salicylamide be being repeatedly agitated with ice-cold N-sodium hydroxide solution. The chloroform solution is washed neutral with water, dried over anhydrous sodium sulphate and the solvent is distilled off under vacuum. The residue is recrystallized from ethyl acetate. The resulting 2-(phenacyloxy)benzamide forms faintly greenish crystals melting at 136 to 137° C.

A solution of 99 g. (0.39 mol) of 2-phenacyloxy)-benzamide in 450 ml. of toluene prepared at 70° C. is mixed with 2.5 g. of p-toluenesulphonic acid and the solution is heated to a vivid boil in a water separator. After 4 hours the theoretically calculated quantity of water (7 ml.) has separated out. The batch is refluxed for another 2 hours and the solution is then cooled, finally to 0° C. The 3-phenyl-1,4-benzoxazepin-5(4H)-one crystallizes in colourless, coarse prisms melting at 164 to 166° C. which are suctioned off and thoroughly washed with 1:1 ether+petroleum ether. Recrystallization from methanol+ether raises the melting point to 166.5° C.

EXAMPLE 2

A mixture of 11.85 g. (0.05 mol) of 3-phenyl-1,4-benzoxazepin-5(4H)-one, 50 g. of finely ground potassium carbonate and 7.9 g. (0.055 mol) of β-dimethylaminoethylchloride hydrochloride in 250 ml. of acetone is refluxed for 15 hours. The undissolved inorganic material is the filtered off and the filtrate evaporated to dryness. The residue is dissolved in chloroform and repeatedly extracted with water. The chloroform solution is dried over anhydrous sodium sulphate and evaporated in vacuo. The residual oil is distilled under a high vacuum, to yield 3-phenyl-4-(β-dimethylaminoethyl) - 1,4 - benzoxazepin-5(4H)-one of the formula

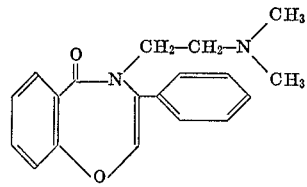

as a yellow, viscous oil boiling at 168 to 173° C. under a pressure of 0.1 mm. Hg.

The maleate may be prepared in the following manner:

The base is dissolved in four times its own weight of acetone and 1 equivalent of maleic acid is added. Then ether is added to the solution until it turns turbid. After having been kept for 12 hours in a refrigerator the maleate crystallizes in colourless flakes melting at 126 to 127° C.

EXAMPLE 3

A mixture of 23.7 g. (0.1 mol) of 3-phenyl-1,4-benzoxazepin-5(4H)-one, 17.4 g. (0.11 mol) of γ-dimethylaminopropylchloride hydrochloride, 300 ml. of isopropanol and 2 g. of potassium iodide is refluxed for 10 hours. The inorganic constituents are filtered off, the filtrate is evaporated in vacuo and the residue dissolved in 150 ml. of toluene. The basic phase is extracted by agitating with 3× 50 ml. of 10% aqueous methanesulphonic acid. The combined extracts are treated with active carbon, filtered and the clear filtrate is rendered alkaline with concentrated ammonia. Extraction with chloroform furnishes 3-phenyl-4-(γ-dimethylaminopropyl) - 1,4 - benzoxazepin-5(4H)-one of the formula

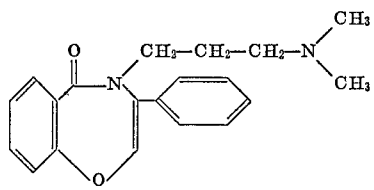

as an oil of orange colour which in the subsequent distillation reveals a boiling point of 185 to 195° C. under a pressure of 0.1 mm. Hg.

The oxalate of the base is accessible in the following manner:

A solution of 12 g. of the base in 100 ml. of acetone is mixed with 3.7 g. of oxalic acid dissolved in 20 ml. of acetone. The oxalate crystallizes in the form of colourless to yellowish needles melting at 183 to 185° C. with decomposition.

EXAMPLE 4

A mixture of 13.6 g. (0.05 mol) of 3-phenyl-7-chloro-1,4-benzoxazepin-5(4H)-one, 30 g. of finely ground potassium carbonate, 13.7 g. (0.08 mol) of β-diethylaminoethylchloride hydrochloride and 1 g. of potassium iodide is boiled under reflux for 15 hours. The undissolved inorganic material is then filtered off with suction, and the filtrate evaporated to dryness. The residue is dissolved in an excess of aqueous methanesulphonic acid of 10% strength, freed from undissolved neutral constituents with active carbon and filtered. The filtrate is rendered alkaline with concentrated ammonia and extracted with choroform. The combined chloroform extracts are evaporated and chromatographed on alumina (activity I–II). The chloroform eluates yield 3-phenyl-4-(β-diethylaminoethyl)-7-chloro-1,4-benzoxazepin-5(4H)-one of the formula

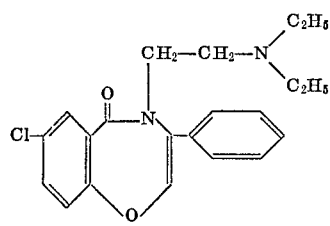

as a yellowish viscous oil.

The maleate crystallizes from acetone in the form of colourless flakes melting at 131–133° C.

3-phenyl-7-chloro-1,4-benzoxazepin-5(4H)-one can be prepared as follows:

171.5 g. (1.0 mol) of 5-chloro-salicylic acid amide are boiled under reflux with 178 g. (1.15 mols) of phenacyl chloride, 420 g. of potassium carbonate powder and 4 g. of potassium iodide in 4000 ml. of acetone for 20 hours with thorough stirring. The reaction mixture is filtered with suction and the solvent evaporated at a water-jet vacuum. The residue is dissolved in chloroform and freed from 5-chlorosalicylic acid amide by extraction with ice-cold N sodium hydroxide solution. The chloroform solution yields on evaporation 2-phenacyloxy-5-chlorobenzamide which, after digestion with isopropanol, yields colourless crystals melting at 177–179° C.

29 g. (0.1 mol) of this product are boiled under reflux in 800 ml. of toluene with 3 g. of para-toluenesulphonic acid on a water-separator until no more water separates off. The product crystallizes in the form of colourless needles melting at 216–217° C. which after cooling are filtered with suction and well washed with water. A single recrystallization from dimethylformamide yields 3-phenyl-7-chloro-1,4-benzoxazepin-5(4H)-one melting at 218–220° C.

EXAMPLE 5

A mixture of 27.2 g. (0.1 mol) of 3-phenyl-7-chloro-1,4-benzoxazepin-5(4H)-one, 21.6 g. (0.15 mol) of β-dimethylamino-ethylchloride hydrochloride and 42 g. of potassium carbonate is boiled under reflux in 1000 ml. of acetone for 20 hours. The undissolved inorganic material is then filtered off with suction and the filtrate evaporated to dryness. The residue is dissolved in an excess of aqueous methane-sulphonic acid of 10% strength, freed from undissolved neutral constituents with active carbon and filtered. The filtrate is rendered alkaline with concentrated ammonia and extracted with chloroform. The combined chloroform extracts are evaporated and chromatographed on alumina (activity I–II). The chloroform eluates yield 3-phenyl-4-(β-dimethylaminoethyl)-7-chloro-1,4-benzoxazepin-5(4H)-one of the formula

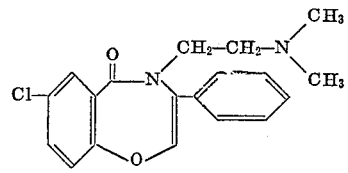

in the form of a colourless oil. The hydrochloride melts at 224° C. (with decomposition) after recrystallization from a mixture of ethanol and ether.

EXAMPLE 6

28.6 g. (0.1 mol) of 2-methyl-3-(para-chlorophenyl)-1,4-benzoxazepin-5(4H)-one, 42 g. of potassium carbonate 21.6 g. (0.15 mol) of β-dimethylaminoethylchloride hydrochloride and 2 g. of potassium iodide are boiled under reflux in 1200 ml. of acetone for 45 minutes. The undissolved inorganic material is filtered off with suction and the filtrate is evaporated to dryness. The residue is dissolved in an excess of aqueous methanesulphonic acid of 10% strength, freed from undissolved neutral constituents with active carbon and filtered. The filtrate is rendered alkaline with concentrated ammonia and extracted with chloroform. The combined chloroform extracts are evaporated and chromatographed on alumina (activity I–II). The chloroform eluates yield 2-methyl-3-(para-chlorophenyl)-4-(β-dimethylaminoethyl)-1,4 - benzoxacepin-5(4H)-one of the formula

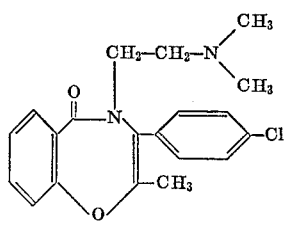

as a yellow viscous oil.

The free base is dissolved in acetone and neutralized with the calculated quantity of methanesulphonic acid. On diluting the solution with ether, the methanesulphonate crystallizes out in the form of colourless flakes melting at 196–197° C.

2-methyl-3-(para-chlorophenyl) - 1,4 - benzoxazepin-5(4H)-one can be prepared in the following manner:

68.5 g. (0.5 mol) of salicylic acid amide, 136.4 g. (0.55 mol) of para-chloro-α-bromopropiophenone, 300 g. of potassium carbonate and 4 g. of potassium iodide are boiled under reflux in 1000 ml. of acetone for 20 hours. After filtration, the filtrate is evaporated and the residue recrystallized from a mixture of ethyl acetate and ether to yield 2-(α-methyl-β-oxo-para-chlorophenethoxy)-benzamide in the form of colourless crystals melting at 154–155° C.

30.4 g. (0.1 mol) of this amide are boiled at a water separator in 750 ml. of toluene after the addition of 3 g. of para-toluenesulphonic acid. After 8 hours the expected quantity (1.8 ml.) of water has separated off. The content of the flask is evaporated, the crystalline residue dissolved in chloroform and extracted twice with water. After drying over sodium sulphate and evaporating the solvent in vacuo, the crystalline residue is digested with ether and then filtered with suction, to yield 2-methyl-3 - (para-chlorophenyl) - 1,4 - benzoxazepin-5(4H)-one in the form of colourless needles melting at 169–170° C.

EXAMPLE 7

A mixture of 14.3 g. (0.05 mol) of 2-methyl-3-(para-chlorophenyl) - 1,4 - benzoxazepin - 5(4H) - one, 30 g. of potassium carbonate, 9.9 g. (0.0625 mol) of γ-dimethylaminopropylchloride hydrochloride and 1 g. of potassium iodide is boiled under reflux in 700 ml. of acetone for 24 hours. 5 g. of the hydrochloride and 15 g. of potassium carbonate are then added and the whole is boiled under reflux for a further 24 hours while stirring well. The undissolved inorganic material is filtered off with suction and the filtrate evaporated to dryness. The residue is dissolved in an excess of aqueous methane-sulphonic acid of 10% strength, freed from undissolved neutral constituents with active carbon and filtered. The filtrate is rendered alkaline with concentrated ammonia and extracted with chloroform. The combined chloroform extracts are evaporated and chromatographed on alumina (activity I–II). The chloroform eluates yield 2 - methyl - 3 - (para-chlorophenyl) - 4 - (γ-dimethylaminopropyl) - 1,4 - benzoxazepin - 5(4H) - one of the formula

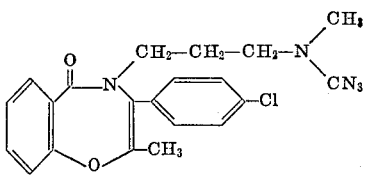

as a yellowish oil. The hydrochloride crystallizes from acetone in the form of colourless prisms melting at 182–184° C.

EXAMPLE 8

A mixture of 14.1 g. (0.05 mol) of 3-phenyl-8-nitro-1,4-benzoxazepin-5(4H)-one, 25 g. of potassium carbonate, 9.0 g. (0.0625 mol) of β-dimethylaminoethylchloride hydrochloride and 1 g. of potassium iodide are boiled under reflux in 1000 ml. of acetone for 20 hours. The undissolved inorganic material is filtered off with suction and the filtrate evaporated to dryness. The residue is dissolved in an excess of aqueous methanesulphonic acid of 10% strength, freed from undissolved neutral constituents with active carbon and filtered. The filtrate is rendered alkaline with concentrated ammonia and extracted with chloroform. The combined chloroform extracts are evaporated and chromatographed on alumina (activity I–II). The chloroform eluates yield 3-phenyl-4-(β-dimethylaminoethyl)-8-nitro - 1,4 - benzoxazepin - 5-(4H)-one of the formula

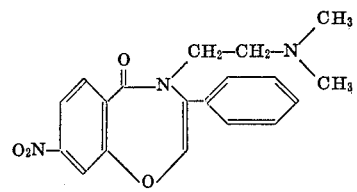

as yellow glassy resin.

The oxalate of the base crystallizes out from a mixture of acetone and methanol in the form of yellow needles melting at 166–168° C.

3 - phenyl - 8 - nitro - 1,4 - benzoxazepin - 5(4H) - one can be prepared as follows:

18.2 g. (0.1 mol) of 4-nitro-salicylic acid amide, 17.8 g. (0.115 mol) of phenacyl chloride, 50 g. of potassium carbonate and 1 g. of potassium iodide are boiled under reflux in 750 ml. of acetone for 30 hours. After cooling, the undissolved material is filtered with suction and washed with a little cold acetone. The filtrate is then stirred with 500 ml. of water and filtered with suction again. The yellow material remaining on the filter is 2 - (phenacyloxy) - 4 - nitro-benzoic acid amide. It melts at 230° C. with decomposition.

13.0 g. (0.0435 mol) of this amide are boiled under reflux in the presence of 1 g. of para-toluenesulphonic acid in 1000 ml. of toluene on a water separator for 15 hours. The still hot yellow solution is treated with active carbon, filtered and then allowed to stand at 0° C. 3-phenyl - 8 - nitro - 1,4 - benzoxazepin - 5(4H) - one crystallizes out in the form of deep yellow flakes melting at 224–226° C.

EXAMPLE 9

In a manner analogous to that described in the foregoing examples starting from 3-phenyl-1,4-benzoxazepin-5(4H)-one and β-morpholinoethylchloride hydrochloride or β-piperidinoethylchloride hydrochloride 3 - phenyl-4-(β - morpholinoethyl) - 1,4 - benzoxazepin - 5(4H) - one or 3-phenyl - 4 - (β-piperidinoethyl) - 1,4 - benzoxazepin-5(4H)-one, respectively, or their hydrochlorides, methanesulfonates or maleates can be obtained.

EXAMPLE 10

Tablets containing 50 mg. of 3 - phenyl - 4 - (β-methylaminoethyl) - 1,4 - benzoxazepin - 5(4H) - one maleate may be prepared, for example, with the following ingredients:

| Ingredients per tablet: | Mg. |
| --- | --- |
| 3-phenyl - 4 - (β-dimethylaminoethyl)-1,4-benzoxazepin - 5(4H) - one maleate | 50 |
| Wheat starch | 59 |
| Lactose | 70 |
| Colloidal silicic acid | 10 |
| Talc | 10 |
| Magnesium stearate | 1 |
| | 200 |

Method

The 3 - phenyl - 4 - (β - dimethylaminoethyl) - 1,4-benzoxazepin - 5(4H) - one maleate is mixed with part of the wheat starch, with lactose and colloidal silicic acid and the mixture passed through a sieve. A further part of the wheat starch is pasted with 5 times the quantitiy of water on a waterbath and the powder mixture kneaded with this paste until a slightly plastic mass is formed. The plastic mass is pressed through a sieve having a mesh of about 3 mm., dried and the dry granulate again passed through the sieve. The remaining wheat starch, talc and magnesium stearate are then added and the mixture compressed to form scored tablets weighing 200 mg.

I claim:

1. A member selected from the group consisting of compounds of the formula

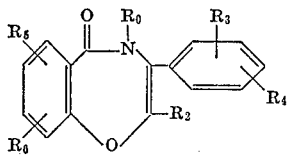

in which $R_0$ stands for a group of the formula

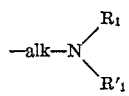

in which alk stands for lower alkylene,

for a member selected from the group consisting of di-lower alkylamino, pyrrolidino, piperidino, C-lower alkylated-pyrrolidino, C-lower alkylated piperidino, C-lower alkylated-N'-lower alkyl-piperazino, N'-lower alkyl-piperazino, N'-(hydroxy-lower alkyl)-piperazino, C-lower alkylated N'-(hydroxy-lower alkyl)-piperazino, C-lower alkylated thiomorpholino, thiomorpholino, morpholino and C-lower alkylated morpholino, $R_2$ stands for a member selected from the group consisting of hydrogen and lower alkyl, $R_3$, $R_4$, $R_5$ and $R_6$ each stands for a member selected from the group consisting of hydrogen, lower alkyl, lower alkoxy, halogen, trifluoromethyl and nitro, and their therapeutically acceptable acid addition salts.

2. A product as claimed in claim 1 in which $R_4$ and $R_6$ stand for hydrogen.

3. A product as claimed in claim 2 in which $R_0$ stands for the group of the formula

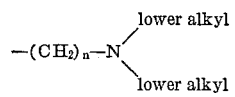

$n$ being an integer from 2 to 3 and $R_2$ stands for a member selected from the group consisting of methyl and hydrogen.

4. A product as claimed in claim 1 wherein $R_2$, $R_3$, $R_4$, $R_5$ and $R_6$ stand for hydrogen and $R_0$ for member selected from the group consisting of β-diethylaminoethyl and γ-dimethylaminopropyl.

5. A product as claimed in claim 1 wherein $R_2$, $R_3$, $R_4$ and $R_6$ stand for hydrogen, $R_5$ for 7-chloro and $R_0$ for a member selected from the group consisting of β-dimethylaminoethyl.

6. A product as claimed in claim 1 which product is the 3-phenyl-4-(β-dimethylaminoethyl)-1,4-benzoxazepin-5-(4H)-one or an acid addition salt thereof.

7. A product as claimed in claim 1 which product is the 2-methyl-3-(para-chlorophenyl)-4-(β-dimethylaminoethyl)-1,4-benzoxazepin-5(4H)-one or an acid addition salt thereof.

8. A product as claimed in claim 1 which product is the 2-methyl - 3 - (para-chlorophenyl) - 4 - (γ-dimethylaminopropyl)-1,4-benzoxazepin-5(4H)-one or an acid addition salt thereof.

9. A product as claimed in claim 1 which product is the 3-phenyl-4-(β-dimethylaminoethyl)-8-nitro-1,4-benzoxazepin-5(4H)-one or an acid addition salt thereof.

References Cited

Huckle et al., "J. Chem. Soc.," 1965, pp. 1137–1141.
Schenker, "Helv. Chim. Acta," vol. 51, February 1968, pp. 413, 421.

HENRY R. JILES, Primary Examiner
R. T. BOND, Assistant Examiner

U. S. Cl. X.R.
424—244, 250, 246, 248, 267, 274

PO-1050
(5/69)

UNITED STATES PATENT OFFICE
CERTIFICATE OF CORRECTION

Patent No. 3,644,338                    Dated February 22, 1972

Inventor(s) KARL SCHENKER ET AL

It is certified that error appears in the above-identified patent and that said Letters Patent are hereby corrected as shown below:

Column 12, line 15, after "of" and before "β" insert

--- β-diethylaminoethyl and ---.

Signed and sealed this 19th day of September 1972.

(SEAL)
Attest:

EDWARD M. FLETCHER, JR.                 ROBERT GOTTSCHALK
Attesting Officer                       Commissioner of Patents aaa